United States Patent
Indutnyy Z. et al.

(10) Patent No.: US 6,387,576 B2
(45) Date of Patent: May 14, 2002

(54) BLACK MATRIX AND PREPARING METHOD THEREOF, AND A DISPLAY DEVICE EMPLOYING THE BLACK MATRIX

(75) Inventors: Ivan Indutnyy Z.; Petro Shepeliavyi E.; Kateryna Michailovskaya V., all of Kyiv (UA); Chang-won Park, Suwon (KR); Joon-bae Lee, Yongin (KR); Yong Han, Seoul (KR)

(73) Assignees: Samsung SDI Co., Ltd., Suwon (KR); Ivan Z. Indutnyy, Kyiv (UA); Petro E. Shepelizvyi; Kateryna V. Michailoyskaya, both of Kyiv (UA)

( * ) Notice: Subject to any disclaimer, the term of this patent is extended or adjusted under 35 U.S.C. 154(b) by 0 days.

(21) Appl. No.: 09/741,108

(22) Filed: Dec. 21, 2000

(30) Foreign Application Priority Data

Dec. 23, 1999 (UA) .............................. 99127035
Sep. 22, 2000 (KR) .......................... 2000-55753

(51) Int. Cl.$^7$ .......................... G02F 1/1335; H01J 29/32
(52) U.S. Cl. .............................. 430/7; 430/25; 430/321; 349/110; 313/470
(58) Field of Search ............................. 430/7, 25, 321; 349/110; 313/470

(56) References Cited

U.S. PATENT DOCUMENTS 4,243,735 A * 1/1981 Kobale et al. ................ 430/25
5,808,714 A * 9/1998 Rowlands et al. .......... 349/110

* cited by examiner

Primary Examiner—John A. McPherson
(74) Attorney, Agent, or Firm—Staas & Halsey LLP

(57) ABSTRACT

A black matrix, a preparation method thereof and a display device employing the black matrix. The black matrix which is a black coating layer surrounding pixels of the display device, includes SiO which is a dielectric material and at least one metal selected from the group consisting of iron (Fe), cobalt (Co), vanadium (V) and titanium (Ti). The black matrix has excellent thermal and chemical stability and is environmentally desirous by using a mixture of a nontoxic metal and a dielectric material. Also, the black matrix exhibits excellent adhesion to a substrate without an annealing process, is excellent in mechanical characteristic due to the absence of internal stress and is capable of being micro-patterned to have a particle size of 1 $\mu$m or less. When applied to the substrate of the display device, the black matrix exhibits excellent external light absorbing effect. Therefore, a display device having improved luminance and contrast characteristics can be attained.

25 Claims, 1 Drawing Sheet

BLACK MATRIX AND PREPARING METHOD THEREOF, AND A DISPLAY DEVICE EMPLOYING THE BLACK MATRIX

CROSS-REFERENCE TO RELATED APPLICATIONS

This application claims the benefit of Ukrainian Application No. 99127035, filed Dec. 23, 1999 in the Ukrainian Patent Office, and Korean Patent Application No. 00-55753, filed Sep. 22, 2000, in the Korean Patent Office, the disclosures of which are incorporated herein by reference.

BACKGROUND OF THE INVENTION

1. Field of the Invention

The present invention relates to a black matrix and a preparing method thereof, and more particularly, to a black matrix which is a black coating layer which surrounds the pixels of a display device, a preparing method thereof, and a display device employing the black matrix.

2. Description of the Related Art

A black matrix, which is a light-absorbing black coating layer for absorbing external light and dispersed emission from neighboring patterns, is formed between phosphor layers of a color cathode ray tube (CRT) or other kinds of display devices. The black matrix features the outer appearance of colored pixels of an overall display device and improves the contrast of a displayed color image.

The black matrix of a color CRT is generally manufactured in the following manner. That is, a graphite dispersive solution is coated and then a photolithography process is performed to form a pattern. Alternatively, a metal oxide (MO) (here, M is either Cr or Ni) and a metal are vacuum-deposited to form a light-absorbing coating layer and patterned by a photolithography process. In addition, a method of forming a black matrix by depositing film-like layers on the inner surface of a display panel using a reactive sputtering method is disclosed in U.S. Pat. No. 5,976,639.

According to this patented invention, the film-like layers include a transition layer and a metal layer. Here, the transition layer is formed such that the concentration of a metal such as chromium (Cr), tungsten (W), tantalum (Ta), titanium (Ti), iron (Fe), nickel (Ni), or molybdenum (Mo) gradually increases in an incident direction of light at a proportion of 0.5 to 20% per 100 Å in film thickness. Also, chromium (Cr) is mainly used as the metal component and the material for forming the metal layer. The thickness of the metal layer must be in the range of 1,000 to 1,400 Å so as to shield a back light beam. Also, the content of the metal contained in the metal layer must be controlled to be in the range of 50 to 100% of the concentrations of all metals contained in the film-like layers. In some cases, the transition layer may further include elements of oxygen, nitrogen or carbon.

As described above, the film-like layers mainly employ environmental contaminants such as chromium, and deposition thereof must be performed under oxygen atmosphere. Also, during formation of the transition layer and the metal layer forming the film-like layers, the compositions and thicknesses of the respective layers must be strictly controlled. Thus, the manufacture of the film-like layers is quite complicated process.

Alternatively, the black matrix may be formed using a vacuum thermal deposition method, as disclosed by the inventors of the present invention, E. Shepeliavyi P., Z. Indutnyy I., and V. Michailovskaya E. in Russian Federation Patent No. 2052864 and Optical Engineering Bulletin No. 2(6), 1995, pp.16–17. According to this method, a black coating layer is formed by depositing a mixture consisting of 70 to 90 wt % of Cr and 10 to 30 wt % of SiO on the inner surface of the color CRT. As the deposition temperature gradually increases, SiO, which is a dielectric material, is first deposited, and both Cr and SiO materials are simultaneously deposited at a higher deposition temperature, and Cr, which is a metal element, is finally deposited at the highest deposition temperature. The mixture ratio of SiO to Cr in the resultant coating layer is continuously changed throughout the coating layer from a pure dielectric material layer on one surface of the coating layer to a pure metal material layer on the other surface thereof. As described above, a desired black matrix pattern is formed such that a black coating layer is first formed and then the black matrix pattern is completed by a photolithography process. Alternatively, a photoresist pattern is first formed by coating photoresist and exposing and developing the same, a black coating layer is then formed on the photoresist pattern, and the photoresist pattern and an undesired black matrix coating layer are finally removed by an etching process, thereby forming a desired black matrix pattern.

The thus-formed black matrix has several advantages in that it is excellent in view of a low coefficient of light diffusion reflection, thermal stability, physical and chemical characteristics compared with the black matrix formed using a colloid-graphite dispersive solution, and does not produce gas pollution when heated. However, the thus-formed black matrix has the following disadvantages. First, the above-described method is undesirable in view of environmental protection because chromium, which is a toxic substance, is employed to this method. Second, the non-homogenous coating layer, deposited on an unheated substrate, is internally stressed and unstable in mechanical characteristics. Thus, in order to obtain an unstressed and stable coating layer, it is necessary to continuously vary the temperature of the substrate while a deposition process is performed, which is quite complex process compared with general vacuum deposition equipment.

SUMMARY OF THE INVENTION

To solve the above problems, it is an object of the present invention to provide a black matrix which has excellent adhesion to a substrate without an annealing process, by using a mixture of a nontoxic metal other than chromium and a dielectric material, which is excellent in a mechanical characteristic due to the absence of internal stress and which is excellent in accomplishing an external light absorbing effect.

It is another object of the present invention to provide a method of preparing the black matrix using general vacuum deposition equipment.

It is still another object of the present invention to provide a display device having improved luminance and contrast characteristics by employing the black matrix.

Additional objects and advantages of the invention will be set forth in part in the description which follows and, in part, will be obvious from the description, or may be learned by practice of the invention.

Accordingly, to achieve the first and other objects of the present invention, there is provided a black matrix which is a black coating layer surrounding pixels of a display device, the black matrix including SiO which is a dielectric material and at least one metal selected from the group consisting of iron (Fe), cobalt (Co), vanadium (V) and titanium (Ti).

Preferably, the content of SiO gradually decreases and the content of metal is gradually increases, along an incident direction of external light.

The mixture ratio of the dielectric material to the metal is preferably 20:80~50:50 by weight.

The second and other objects of the present invention are achieved by a method of preparing a black matrix including injecting into a deposition boat a mixture consisting of 20 to 50 wt % of SiO which is a dielectric material and 50 to 80 wt % of at least one metal selected from the group consisting of Fe, Co, V and Ti, the mixture components having different melting points, mounting a panel of a display device on a vacuum deposition device and depositing SiO and metal while varying the temperature of the deposition boat, and patterning the resultant structure by a photolithography process.

In the step of depositing SiO and metal, while the temperature of the deposition boat gradually increases, SiO is first deposited, and both SiO and metal are simultaneously deposited at a higher temperature and metal is deposited at the highest temperature. Thus, SiO is distributed such that the content thereof gradually decreases along an incident direction of external light, and the metal is distributed such that the content thereof gradually increases along the incident direction of external light.

The third and other objects of the present invention are achieved by providing a display device employing the black matrix. In a preferred embodiment of the present invention, the display device includes a color cathode ray tube or a liquid crystal display device.

BRIEF DESCRIPTION OF THE DRAWING

The above objects and advantages of the present invention will become more apparent by describing in detail a preferred embodiment thereof with reference to the attached drawing in which.

DESCRIPTION OF THE PREFERRED EMBODIMENT

Figure 1:
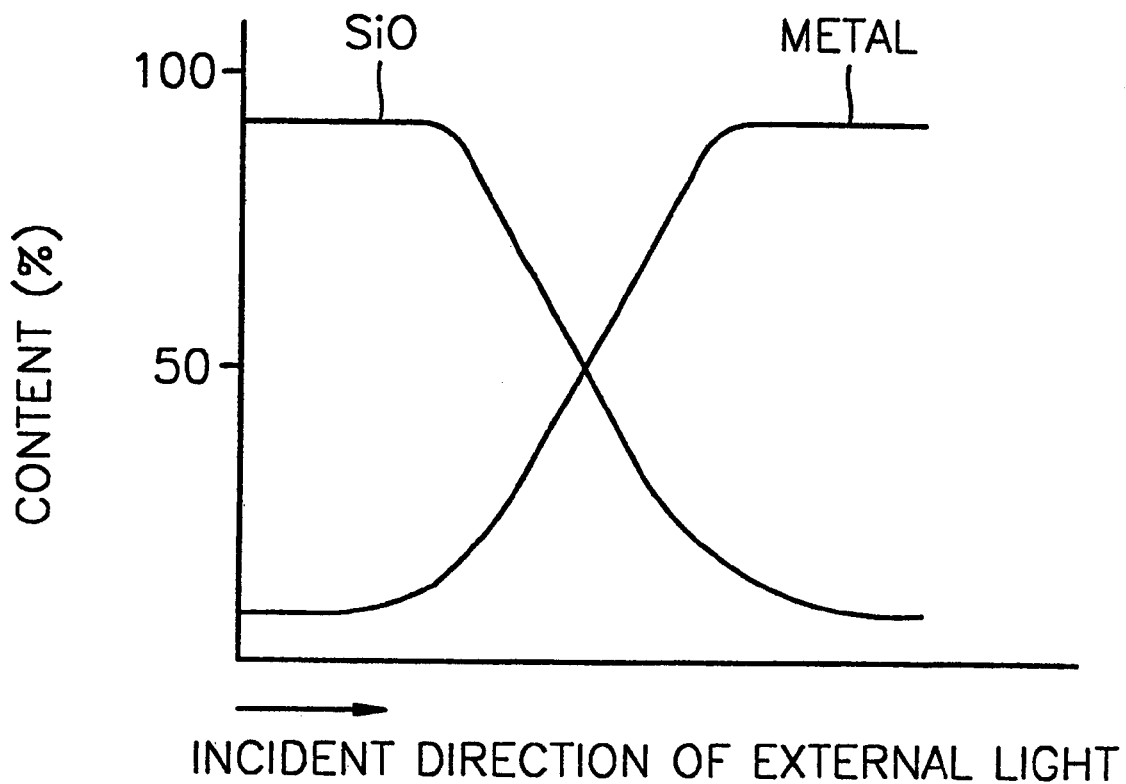
FIG. 1 is a diagram illustrating the distribution of a dielectric material and metal in a black matrix according to an embodiment of the present invention.

Reference will now made in detail to the present preferred embodiments of the present invention, examples of which are illustrated in the accompanying drawing. The embodiments are described below in order to explain the present invention by referring to the figure.

A black matrix must have high electric conductivity and low reflectance at the outer surface of a display panel. To satisfy these requirements, the present invention is directed to an achromatic black matrix which has high absorbance and low reflectance throughout a wide spectral range depending on a refractive index n and an absorbance k of a non-homogenous layer by forming a metal-dielectric material layer in which the composition thereof varies along an incident direction of the incident light.

The black matrix according to the present invention has the component distribution as shown in FIG. 1.

Referring to FIG. 1, the content of SiO existing in the black matrix formed on a panel of a display device gradually decreases and the content of metal gradually increases, along an incident direction of external light. Also, SiO and metal exist in a substantially equal amount at the location corresponding to a half the overall thickness of the black matrix layer. In the black matrix according to the present invention having the above-described component distribution, since the dielectric material and metal are deposited slowly using an inversely proportional content gradient, a layered structure is not produced. Also, since, instead of reflection, absorption of light occurs at the interface between the dielectric material and metal using the gradient of refractive indices of the dielectric material and metal, the reflectance of the black matrix is noticeably reduced compared to the conventional case. In particular, in the black matrix according to the present invention, the refractive index of $SiO_2$ forming a panel of a display device and the refractive index of SiO existing in the area adjacent to the panel are substantially equal, that is, approximately 1.5. Thus, transmittance rather than reflection occurs at the interface between the panel and the black matrix. Also, the refractive index gradually increases in the incident direction of external light by gradient in the content throughout the black matrix and the transmittance gradually decreases. Thus, the structure is constructed such that the external light is almost entirely absorbed without being reflected.

As described above, the black matrix having the non-homogenous composition is manufactured using general vacuum deposition equipment as follows.

A mixture of metal and a dielectric material having different melting points are injected into a deposition boat and then a panel of a display device is mounted on a vacuum deposition device. Here, the mixture of metal and a dielectric material consists of 50 to 80 wt % of metal which is at least one selected from the group consisting of Fe, Co, V and Ti and 20 to 50 wt % of SiO. Here, if the content of metal is greater than 80 wt %, the optical density of the black matrix is poor, that is, less than 3.5, and the surface resistance thereof increases to approximately $10^5$ $\Omega/\square$. If the content of metal is less than 20 wt %, the reflectance of the black matrix is undesirably lowered.

Next, while varying the temperature of the deposition boat holding the mixture of metal and a dielectric material, vacuum thermal deposition is carried out. Here, in order to vary the temperature of the deposition boat, a method of slowly increasing the voltage applied to the deposition boat, is used.

If the deposition temperature is slowly increased according to the passage of time, SiO, that is, a dielectric material, starts to be first deposited, then both the dielectric material and metal are simultaneously deposited, and only the metal element, without any dielectric material remaining, is finally deposited at the highest temperature. As a result, as shown in FIG. 1, SiO is distributed such that the content thereof gradually decreases along the incident direction of external light and the metal is distributed such that the content thereof gradually increases along the incident direction of external light. Unlike in the SiO-Cr deposition process, in the above-described SiO-metal deposition process, evaporation of metal is performed by melting rather than sublimation.

In other words, at least one metal selected from the group consisting of Fe, Co, V and Ti has a phase diagram different from that of Cr. Thus, while Cr is immediately sublimated upon being heated, the metal is melted when being heated to then be converted into a liquid state, and SiO mixed with the liquid metal is sublimated to then be deposited on the panel of a display device. As described above, if SiO is sublimated in a state in which it is mixed with the liquid metal, a limitation in mass production due to the popping-out problem of SiO powder can be avoided. Here, a variation in the component distribution corresponding to the thickness of the black matrix greatly depends on the initial particle size of SiO. In detail, if the sizes of SiO particles are as small as 0.5 mm, the contact area between the SiO particles and the deposition boat is relatively larger than the overall surface area of SiO particles so that the thermal contact between the SiO particles and the deposition boat becomes frequent. If the sizes of SiO particles are small, the particle weight is also small. Thus, jet flow is generated due to a large vapor pressure instantaneously produced by heat conductivity. Accordingly, SiO particles escape from the deposition boat. As a result, sublimation of SiO occurs intensely. On the other hand, if the sizes of SiO particles are as large as 2 mm, the particle weight is also large, so that the deposited amount becomes insufficient compared to the overall loaded amount, while not being affected by jet flow. Thus, the black matrix having the optimum optical and electrical characteristics is produced by adjusting the sizes of SiO particles contained in the mixture of SiO and metal to be in the range of 1 to 1.5 mm.

When the deposition of SiO and metal is completed in the above-described manner, the resultant structure is patterned by a photolithography process, thereby completing the black matrix according to the present invention. The thickness of the thus-formed black matrix is 0.2 to 0.6 $\mu$m, preferably 0.4 to 0.5 $\mu$m. If the thickness of the black matrix is less than 0.2 $\mu$m, the optical density decreases. If the thickness of the black matrix is greater than 0.6 $\mu$m, the cost undesirably rises.

As the photolithography process, a direct photolithography method or a blast photolithography method can be employed.

In the direct photolithography method, positive photoresist is coated on the surface where the black matrix is formed, exposed using a shadow mask and developed to form a photoresist pattern. Thereafter, a predetermined portion off the black matrix is etched using the photoresist pattern and then the residual photoresist pattern is removed, thereby completing a black matrix pattern.

In the blast photolithography method, a photoresist pattern is formed on a panel by coating photoresist, and exposing and developing the same. Then, a black coating layer is formed on the photoresist pattern and the photoresist pattern and the black coating layer on an undesired area are then removed using etching, thereby completing a black matrix pattern.

The black matrix according to the present invention can be applied to various kinds of display devices, specifically, a color cathode ray tube (CRT) or a liquid crystal display device (LCD) employing a color filter.

The present invention will now be described in detail by referring to the following examples, but the invention is not limited to those examples.

EXAMPLE 1

160 mg of a mixture containing 25 wt % SiO having a particle diameter of 1.5 mm and 75 wt % Fe was put into a deposition boat and then the distance between the deposition boat and a panel was adjusted to be 18.5 cm.

The panel was mounted in a vacuum deposition device and was then pumped out to maintain the vacuum degree of $2 \times 10^{-3}$ Pa. Then, while varying the temperature of the deposition boat, deposition is performed to form a black coating layer having a thickness of 400 nm on the panel.

After the black coating layer is formed on the panel, positive organic photoresist is coated on the surface of the black coating layer using a centrifuge and then exposed to UV through a shadow mask. Thereafter, the resultant structure is developed to harden the unexposed area to form a photoresist pattern. The black coating layer is patterned using the photoresist pattern. Then, the photoresist pattern is cleaned using deionized water and dried using compressed gas for removal, thereby preparing a patterned black matrix.

EXAMPLE 2

A patterned black matrix was prepared in the same manner as described in Example 1, with the exception of the particle diameter of SiO being 1 mm and a mixture sample of SiO and Fe being 200 mg.

EXAMPLE 3

A patterned black matrix was prepared in the same manner as described in Example 1, with the exception of 220 mg of mixture containing 40 wt % SiO having a particle diameter of 1 mm and 60 wt % Ti being injected into a deposition boat.

EXAMPLE 4

A patterned black matrix was prepared in the same manner as described in Example 1, with the exception of 210 mg of mixture containing 40 wt % SiO having a particle diameter of 1 mm, 10% Ti and 50 wt % Fe being injected into a deposition boat.

EXAMPLE 5

A patterned black matrix was prepared in the same manner as described in Example 1, with the exception of 210 mg of mixture containing 40 wt % SiO having a particle diameter of 1 mm, 50 wt % Ti and 10 wt % Fe being injected into a deposition boat.

EXAMPLE 6

A patterned black matrix was prepared in the same manner as described in Example 1, with the exception of 200 mg of mixture containing 33 wt % SiO having a particle diameter of 1 mm and 67 wt % V being injected into a deposition boat.

EXAMPLE 7

A patterned black matrix was prepared in the same manner as described in Example 1, with the exception of 300 mg of mixture containing 33 wt % SiO having a particle diameter of 1 mm and 67 wt % V being injected into a deposition boat.

EXAMPLE 8

A patterned black matrix was prepared in the same manner as described in Example 1, with the exception of 200 mg of mixture containing 33 wt % SiO having a particle diameter of 1 mm and 67 wt % Co being injected into a deposition boat.

COMPARATIVE EXAMPLE 1

A patterned black matrix was prepared in the same manner as described in Example 1, with the exception of the content of SiO being 5 wt % and the content of Fe being 95 wt %.

COMPARATIVE EXAMPLE 2

A patterned black matrix was prepared in the same manner as described in Example 1, with the exception of the content of SiO being 70 wt % and the content of Fe being 30 wt %.

COMPARATIVE EXAMPLE 3

A patterned black matrix was prepared by coating a colloid graphite dispersive solution.

The black matrix patterns prepared by Examples 1 to 8 were observed using an optical microscope.

The observation results showed that the black matrix patterns according to Examples 1 through 8 had the shapes and sizes corresponding to those of shadow masks used for exposure, and the edges of the layer patterns were sharply formed.

Also, the electrical and optical characteristics of the black matrix patterns prepared by Examples 1 through 8 and Comparative Examples 1 through 3 were evaluated and the evaluation results are listed in Table 1.

In Table 1, $\gamma$ denotes a surface resistance, $R_m$ denotes a coefficient of light mirror reflectance and $R_d$ denotes a coefficient of light diffuse reflectance, respectively.

TABLE 1

| | Composition (wt %) | $\gamma$ ($\Omega/\square$) | $R_m$ (%) | $R_d$ (%) | Optical density | Quality of black matrix |
|---|---|---|---|---|---|---|
| Example 1 | $(SiO)_{25}Fe_{75}$ | 25 | 1.3 | 0.08 | $\geq 3.5$ | Achromatic black |
| Example 2 | $(SiO)_{25}Fe_{75}$ | 40 | 1.2 | 0.09 | $\geq 3.5$ | Achromatic black |
| Example 3 | $(SiO)_{40}Ti_{60}$ | 35 | 1.1 | 0.09 | $>4$ | Achromatic black |
| Example 4 | $(SiO)_{40}Fe_{50\text{-}}Ti_{10}$ | 35 | 0.9 | 0.08 | $>3.8$ | Achromatic black |
| Example 5 | $(SiO)_{40}Fe_{10\text{-}}Ti_{50}$ | 35 | 1 | 0.09 | $\geq 3.8$ | Achromatic black |
| Example 6 | $(SiO)_{33}V_{67}$ | 28 | 0.7 | 0.05 | $\geq 4.5$ | Achromatic black |
| Example 7 | $(SiO)_{33}V_{67}$ | 25 | 0.7 | 0.05 | $\geq 4.75$ | Achromatic black |
| Example 8 | $(SiO)_{33}Co_{67}$ | 40 | 1.2 | 0.1 | $\geq 3.8$ | Achromatic black |
| Comparative Example 1 | $(SiO)_{5}Fe_{95}$ | 10 | 30 | 0.08 | $\geq 4.1$ | Metallic brightness |
| Comparative Example 2 | $(SiO)_{70}Fe_{30}$ | $\sim 10^5$ | 11 | 0.09 | $\leq 2.0$ | Semi-transparent |
| Comparative Example 3 | Colloid graphite dispersive solution | 5000 | 5 | 1.3 | $>4$ | Achromatic black |

Referring to Table 1, the black matrix patterns prepared by Examples 1 through 8 are achromatic black, have a light mirror reflectance coefficient of approximately 1%, a light diffuse reflectance coefficient of approximately 0.08 to 0.09% throughout the panel, a surface resistance of 25 to 40 $\Omega/\square$, and an optical density of approximately 4.0, exhibiting excellent characteristics in view of reflectance, resistance and optical density.

On the other hand, the black matrix prepared in Comparative Example 1 has metallic brightness and a poor light mirror reflectance coefficient, i.e., 30%, while being excellent in view of resistance and optical density characteristics.

Although having an excellent mechanical characteristic, the black matrix prepared in Comparative Example 2 has too high a surface resistance to meet the technical requirement as a black matrix. Also, the black matrix has a poor optical density of 2 or less due to the low content of metal, and the color sensitivity thereof is poor, i.e., semitransparent.

In display devices employing the black matrixes prepared in Examples 1 through 8, dot matrix patterns and stripe patterns of the black matrixes were observed using an optical microscope.

From the observation results, it was confirmed that the black matrixes prepared in Examples 1 through 8 have excellent film planarity and excellent pattern shapes, that is, sharp edges of film patterns. Also, the black matrixes could be micro-patterned to have a pattern size of 1 $\mu$m or less.

Although the preferred embodiments of the invention have been described by referring to examples, which are presented for illustrative purposes only, it is apparent to those skilled in the art that various modifications and other equivalent embodiments are possible. Therefore, it is intended that the true scope and spirit of the invention be defined by the claims appended hereto.

What is claimed is:

1. A black matrix which is a black coating layer surrounding pixels of a display device, the black matrix comprising:
    a dielectric material comprising SiO; and
    at least one metal selected from the group consisting of iron (Fe), cobalt (Co), vanadium (V) and titanium (Ti);
    wherein a content of the SiO decreases and a content of the at least one metal increases, along an incident direction of external light to the display device.

2. The black matrix according to claim 1, wherein the black matrix has a thickness of 0.2 to 0.6 $\mu$m.

3. A method of preparing a black matrix comprising:
    injecting into a deposition boat a mixture consisting of 20 to 50 wt % of SiO which is a dielectric material and 50 to 80 wt % of at least one metal selected from the group consisting of Fe, Co, V and Ti, the mixture components having different melting points;
    mounting a panel of a display device on a vacuum deposition device and depositing the SiO and the at least one metal while varying the temperature of the deposition boat; and
    patterning the resultant structure by a photolithography process.

4. The method according to claim 3, wherein the depositing of the SiO and at least one metal comprises increasing the temperature of the deposition boat while depositing the SiO and the at least one metal so that the SiO is first deposited, then the SiO and the other at least one metal are simultaneously deposited at a higher temperature and then the at least one metal is deposited at a highest temperature, wherein the SiO is distributed such that a content thereof decreases along an incident direction of external light, and the at least one metal is distributed such that a content thereof increases along the incident direction of external light.

5. The method according to claim 3, wherein sizes of particles of the SiO contained in the mixture of the SiO and the at least one metal is in a range of 1 to 1.5 mm.

6. The method according to claim 3, wherein a thickness of the black matrix is 0.2 to 0.6 $\mu$m.

7. A display device comprising:
    a substrate;
    a black matrix formed on the substrate, the black matrix comprising:
        SiO which is a dielectric, and
        at least one metal selected from the group consisting of iron (Fe), cobalt (Co), vanadium (V) and titanium (Ti);
    wherein a content of the SiO decreases and a content of the at least one metal increases, along an incident direction of external light to the display device.

8. The display device according to claim 7 wherein the display device is a color cathode ray tube.

9. The display device according to claim 7 wherein the display device is a liquid crystal display.

10. A display device having a black matrix produced according to the method of:
   injecting into a deposition boat a mixture consisting of 20 to 50 wt % of SiO which is a dielectric material and 50 to 80 wt % of at least one metal selected from the group consisting of Fe, Co, V and Ti, the mixture components having different melting points;
   mounting a panel of the display device on a vacuum deposition device and depositing the SiO and at least one metal while varying the temperature of the deposition boat; and
   patterning the resultant structure by a photolithography process.

11. The display device according to claim 10, wherein the depositing of the SiO and the at least one metal comprises increasing the temperature of the deposition boat such that the SiO is first deposited, then both the SiO and at least one metal are simultaneously deposited at a higher temperature and the at least one metal is deposited at a highest temperature, wherein the SiO is distributed such that a content thereof decreases along an incident direction of external light of the display device, and the at least one metal is distributed such that a content thereof increases along the incident direction of external light.

12. A black matrix which is a black coating layer surrounding pixels of a display device, the black matrix consisting of:
   a dielectric material comprising SiO; and
   at least one metal selected from the group consisting of iron (Fe), cobalt (Co), vanadium (V) and titanium (Ti).

13. The black matrix according to claim 12, wherein a content of the SiO decreases and a content of the at least one metal increases, along an incident direction of external light to the display device.

14. A black matrix which is a black coating layer surrounding pixels of a display device, the black matrix comprising:
   a dielectric material comprising SiO; and
   at least one metal selected from the group consisting of iron (Fe) and vanadium (V).

15. The black matrix according to claim 14, further comprising at least one metal selected from the group consisting of titanium (Ti) and cobalt (Co).

16. The black matrix according to claim 14, wherein a content of the SiO decreases and a content of the at least one metal increases, along an incident direction of external light to the display device.

17. A display device comprising:
   a substrate;
   a black matrix formed on the substrate, the black matrix consisting of:
      a dielectric material comprising SiO, and
      at least one metal selected from the group consisting of iron (Fe), cobalt (Co), vanadium (V) and titanium (Ti).

18. The display device according to claim 17, wherein a content of the SiO decreases and a content of the at least one metal increases, along an incident direction of external light to the display device.

19. The display device according to claim 17, wherein the display device is a color cathode ray tube.

20. The display device according to claim 17, wherein the display device is liquid crystal display.

21. A display device comprising:
   a substrate;
   a black matrix formed on the substrate, the black matrix comprising:
      a dielectric material comprising SiO, and
      at least one metal selected from the group consisting of iron (Fe) and vanadium (V).

22. The black matrix according to claim 21, further comprising at least one metal selected from the group consisting of titanium (Ti) an cobalt (Co).

23. The black matrix according to claim 21, wherein a content of the SiO decreases and a content of the at least one metal increases, along an incident direction of external light to the display device.

24. The display device according to claim 21, wherein the display device is a color cathode ray tube.

25. The display device according to claim 21, wherein the display device is liquid crystal display.

* * * * *